United States Patent
Ramirez, Jr. et al.

(10) Patent No.: US 6,906,493 B1
(45) Date of Patent: Jun. 14, 2005

(54) ELECTRONIC BRAKE FOR MOTOR

(75) Inventors: Emilio A. Ramirez, Jr., Hanover Park, IL (US); Athanase N. Tsergas, Wood Dale, IL (US)

(73) Assignee: Molon Motor and Coil Corporation, Rolling Meadows, IL (US)

( * ) Notice: Subject to any disclaimer, the term of this patent is extended or adjusted under 35 U.S.C. 154(b) by 53 days.

(21) Appl. No.: 10/759,054

(22) Filed: Jan. 20, 2004

(51) Int. Cl.$^7$ ................................. H02P 1/44
(52) U.S. Cl. ............... 318/751; 318/375; 318/378; 318/381; 318/445; 318/272; 318/277
(58) Field of Search ................. 318/375, 378, 318/381, 445, 272, 277, 751, 757, 759, 766

(56) References Cited

U.S. PATENT DOCUMENTS

| | | | |
|---|---|---|---|
| 2,929,977 A | | 3/1960 | Choudhury |
| 3,341,758 A | | 9/1967 | Plumpe, Jr. |
| 3,475,669 A | | 10/1969 | Oltendorf |
| 3,651,389 A | * | 3/1972 | Ito el al. ............... 318/266 |
| 3,798,523 A | * | 3/1974 | Gross ................... 318/762 |
| 3,872,363 A | * | 3/1975 | Gross ................... 318/762 |
| 3,971,971 A | * | 7/1976 | Wycoff ................. 318/743 |
| 4,095,151 A | | 6/1978 | Mourick |
| 4,195,255 A | | 3/1980 | Guttmann |
| 4,374,352 A | | 2/1983 | Webster |
| 4,422,021 A | * | 12/1983 | Schwarz .............. 318/376 |
| 4,450,397 A | | 5/1984 | Painter et al. |
| 4,556,831 A | * | 12/1985 | Sakamoto et al. .... 318/434 |
| 5,294,874 A | * | 3/1994 | Hessenberger et al. .... 318/759 |
| 5,350,985 A | * | 9/1994 | Konrad et al. ....... 318/370 |
| 5,705,903 A | | 1/1998 | Hastings |

FOREIGN PATENT DOCUMENTS

| | | |
|---|---|---|
| JP | 58-124685 | 7/1983 |
| JP | 5-64474 | 3/1993 |

* cited by examiner

*Primary Examiner*—Rina Duda
(74) *Attorney, Agent, or Firm*—Oblon, Spivak, McClelland, Maier & Neustadt, P.C.

(57) ABSTRACT

In an electronic system, motor braking is accomplished by applying direct current (DC) voltage, developed across a capacitive element during a run mode operation, across terminals of an alternating current (AC) or an induction motor. While the motor is ON, i.e. during the run mode operation, a diode rectifies an AC input voltage applied across a capacitor for charging thereof. Resistive elements in series with the capacitor control a charging rate thereof. When a relay or switch flips over to a STOP or OFF mode, i.e. a braking mode operation, all of the stored DC voltage, which was charged across the capacitor during the run mode operation, is dropped across a coil of the motor. This DC voltage creates an electric force applied to stop quickly and efficiently the motor shaft rotation. In preferred embodiments of the invention, it was found that the higher the capacitance of the electrolytic capacitor, the faster and more efficient the stopping action will be for the motor.

5 Claims, 1 Drawing Sheet

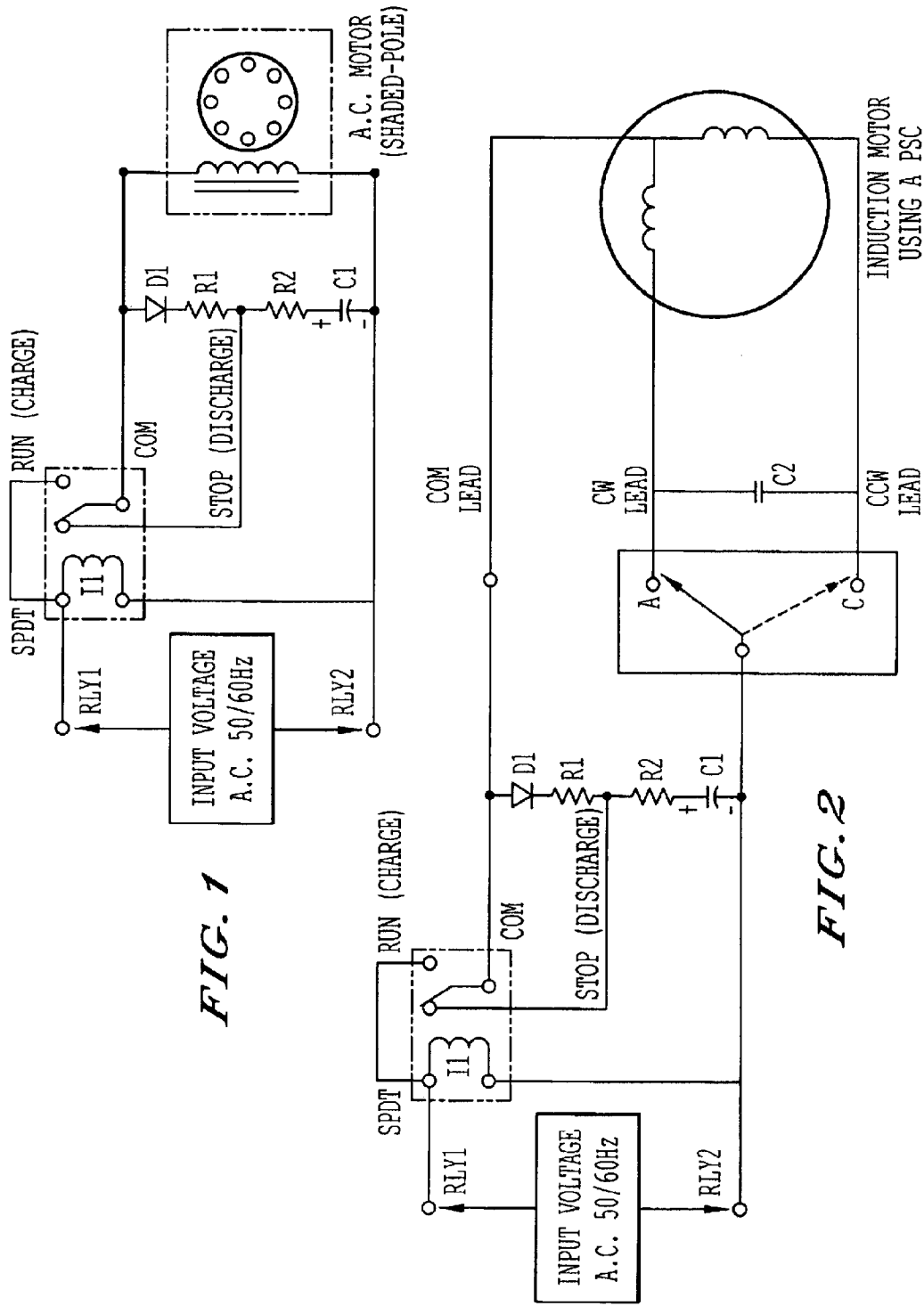

ELECTRONIC BRAKE FOR MOTOR

BACKGROUND OF THE INVENTION

1. Field of the Invention

The invention relates to electric motor power systems, in particular to an electronic system for either an alternating current (hereinafter AC) type motor or an induction-type motor, such as a motor using a permanently split capacitor (hereinafter PSC), or a shaded pole type of an AC induction motor.

2. Discussion of the Prior Art

The general concept of charging a capacitor through a diode while the motor is turned ON so that the charge on the capacitor may be applied across the motor to provide a force when the motor is turned OFF is well known in the prior art related to systems for AC-type motors. There are several examples of this general concept in the patent literature.

U.S. Pat. No. 2,929,977 to Choudhury discloses a dynamic system for induction motors. The system utilizes a capacitor charged by connection to an AC power source through a rectifier which for the capacitor is connected between two phase terminals of the motor in order to supply direct current excitation of two terminals between which the primary winding is not connected after a sufficient time delay for the motor speed to be reduced by the effect of the capacitor.

U.S. Pat. No. 3,341,758 to Plumpe, Jr. discloses a motor system using a signal-controlled rectifier (SCR) which is fired to discharge a direct current (hereinafter DC) potential across a capacitor through an AC motor winding. A second capacitor is charged to a DC potential to maintain the SCR nonconductive until the AC source voltage to the motor has been interrupted.

U.S. Pat. No. 3,475,669 to Oltendorf discloses a variable dynamic DC brake for an AC motor wherein a relatively large brake storage capacitor is connected in a charging circuit connected to an AC power supply for the motor. The charging circuit provides means to adjust the maximum charge on the brake capacitor and includes a signal-controlled rectifier (SCR) connected in series with the brake capacitor.

U.S. Pat. No. 4,095,151 to Mourick discloses an arrangement for an AC series motor with a switching device for changing from a running motor to an operation having a series circuit consisting of a capacitor and a charging diode associated therewith. To avoid an additional resistor for limiting the capacitor charging current, the capacitor and charging diode are connected such that the armature winding is shunted by the series circuit consisting of the capacitor and the charging diode. A switch contact is connected between the center of the series connection and the external terminal of the field winding so that, during motor operation, a series circuit consisting of the capacitor, the charging diode and the field winding is connected between the terminals of the AC series motor. In operation, the armature winding in series with the field winding is shunted by the capacitor which has a potential that provides a braking force. However, this universal motor is not applicable to the present invention.

U.S. Pat. No. 4,195,255 to Guttmann discloses an electronic brake for AC motors. A controlled rectifier applies a direct current to the motor and a control turns the rectifier on for a timed interval determined by the charging rate of a timing capacitor through a variable resistance after deactivation of the motor.

U.S. Pat. No. 4,374,352 to Webster discloses an AC induction motor system. A three-terminal network, which electrically senses the time the voltage is applied to an AC induction motor, is removed and concurrently therewith utilizes energy previously stored in a capacitor to effect an eddy current in the motor. However, this AC induction motor with its complicated circuitry is not applicable to the present invention.

U.S. Pat. No. 4,450,397 to Painter et al. discloses an electronic AC induction motor control circuit including a selectively signal-controlled rectifier (SCR) which operates in a first conductive mode to apply a rectified current to a winding to brake the motor and in a second nonconductive mode. A switching circuit coupled to the rectifier is responsive to the disconnecting of the AC voltage source from the winding for switching the rectifier between the first and second modes of operation at a second switching rate different from a first switching rate to brake the motor at a corresponding second rate.

U.S. Pat. No. 5,705,903 to Hastings discloses an electric brake for an AC motor designed for bringing the motor to a rapid halt. The electric brake includes a capacitor C1 which is charged to a preselected voltage when the motor is ON. A shunt regulator 18 prevents the capacitor from overcharging by shunting the charging current to ground after the capacitor reaches the preselected voltage. However, this universal motor is not applicable to the present invention.

Japanese Patent No. 58-124685 to Aoki discloses a method for stopping a motor utilizing three switches S1, S2, S3, capacitors C1 and C2, and a diode D which is used to charge capacitor C2, such that, when switch S2 is closed, the discharging of the charge accumulated in the capacitor C2 through the motor provides a braking force. See FIG. 2.

Japanese Patent No. 5-064474 to Miyama et al. discloses a brake system for an AC motor wherein an AC voltage commercial power supply is stepped down through a step-down transformer and rectified through a rectifier, such that the rectified output passes through capacitors 17 and 15 to produce a smoothed DC voltage. At the same time, the capacitor 15 is charged through a resistor 13. This patent gives basic information and provides common knowledge about an AC motor using DC voltage for a brake. The patentees are using AC induction, not a shaded pole, and a synchronous motor. They admit that this circuit may not be able to stop the motor. Therefore, an outside braking source may be required. This Japanese circuit is using a signal-controlled rectifier (SCR) that is controlled through a voltage regulator which is a monostable multivibrator circuit MM 19, clamped by a Zener diode 53. This prior art circuit is also using two switches 5 and 37 and a full wave bridge comprised of diodes 47 and 49. Because Miyama et al. are controlling the charging voltage as well as the rate of discharge, the AC motor cannot stop quickly.

Based upon a preliminary review, the patents to Mourick, Webster, Hastings and Aoki appear to disclose the general concept of a system for an AC-type motor wherein a capacitor is charged through a diode and/or resistor during run mode operation, and the DC voltage stored in the capacitor is dropped across the coil of an AC motor during an OFF or STOP mode operation to provide a dynamic force. Other references discussed above relate more to the evolution and/or state-of-the-art in regard to systems for AC-type motors in general.

Despite developments in the prior art, no simple circuitry comprised of a capacitive element, an AC voltage rectifying diode, an electrolytic capacitor, a pair of resistive elements which control the charge rate of the capacitive element, and a relay or switch for controllably transferring the operation of a motor to and from a run mode operation, i.e. an ON mode operation, and a braking mode operation, i.e. a STOP or OFF mode operation, has been developed.

SUMMARY OF THE INVENTION

The electronic braking circuit of the present invention is designed to charge fully an electrolytic capacitor during a run mode operating cycle of a motor. Upon switching off the motor, the charge previously developed across the capacitor is immediately dropped fully across the coil of the motor resulting in the application of a braking force upon the motor to halt quickly any further rotation of the motor shafts. The larger the capacitive value of the capacitor, the quicker and more efficient the stopping action of the motor braking force.

The above action is based on the principle that AC-type induction motors brake quickly when DC voltage instead of AC voltage is applied to such a motor.

A more complete appreciation of the invention and its advantages will be readily understood by reference to the following detailed description when considered in connection with the accompanying drawing.

BRIEF DESCRIPTION OF THE DRAWINGS

FIG. 1 is a schematic view of a preferred embodiment of a circuit which functions as an electronic brake for an AC-type motor having a shaded pole.

FIG. 2 is a schematic view of a preferred embodiment of a circuit which functions as an electronic brake for an induction motor using a PSC.

DETAILED DESCRIPTION OF THE PREFERRED EMBODIMENTS

Reference is now made to the drawings where like numerals and letters designate identical or corresponding parts throughout the schematic views of FIGS. 1 and 2. Other features of the invention will become more apparent in the course of reviewing the following description of the preferred exemplary embodiments provided to illustrate the invention, while not intending to be limiting thereof.

In FIG. 1, a first preferred embodiment of the electronic brake includes a 50/60 Hertz (Hz) AC input voltage supply applied between a first input terminal RLY1 and a second input terminal RLY2 of an inductive relay or switch SPDT. The relay or switch SPDT may include an inductive element I1 connected across the AC input voltage source, a run mode RUN or ON terminal which is normally open and connected to the first input terminal RLY1, and a braking mode OFF or STOP terminal which is normally closed. The relay or switch SPDT also includes a common terminal COM selectively connected to either the RUN terminal or the STOP terminal. In FIG. 1, the common terminal COM is shown to be connected to the STOP or DISCHARGE terminal.

The RUN or CHARGE terminal connects to a first common node shared with an anode side connection terminal of a diode D1 and a first input connection terminal of an AC shaded-pole motor. A first resistive element R1 connects in series between a cathode side connection terminal of the diode D1 and the STOP terminal. A second resistive element R2 connects in series between the STOP terminal and a positive side terminal of an electrolytic aluminum capacitive element C1. A negative side terminal of the capacitive element C1 connects to a second common node shared with the second AC voltage supply input terminal RLY2 and a second input connection terminal of the AC motor.

With the relay or switch SPDT in the ON position during the RUN mode operation, the common terminal COM is connected to the RUN terminal and the AC input voltage is applied in parallel across three paths: the inductive element I1 of the relay or switch SPDT; the series connection of the diode D1, the resistor R1, the resistor R2 and the capacitor C1; and the first and second input terminals of the AC motor.

While the AC motor is ON during this RUN mode operation, the diode D1 rectifies the AC input voltage which is applied across the electrolytic capacitor C1 for charging thereof. The resistors R1 and R2 control the charge rate of the electrolytic capacitor C1.

With the relay or switch SPDT in the OFF or STOP position during the braking mode operation, the common terminal COM is connected to the STOP terminal. The AC input voltage is applied across only the inductive element I1 of the relay or switch SPDT.

The DC voltage, previously charged across the electrolytic capacitor C1 during the RUN mode operation, is dropped across the series connection of the resistor R2 and input terminals of the AC motor, thus creating a dynamic braking force which is applied to the AC motor.

When the relay or switch RLY1 is switched or flipped over to connect with the STOP terminal during the braking mode operation, all stored voltage developed across capacitor C1, which is in the form of DC voltage, is dropped across a coil of the AC motor, which may be a shaded pole-type motor. Dropping the DC voltage, charged across the capacitor C1 during the RUN mode operation, creates a braking force within the AC motor. The inventors discovered that the higher the capacitance value of the electrolytic capacitor C1, the more quickly and efficiently the stopping action will be across the AC motor due to the braking force created.

The first preferred embodiment was subjected to tests with an 80-lam motor having a shaded pole where laminations formed a two-inch high stack. This preferred embodiment was found to work best using a 220-microfarad (MFD), 50-ohm, 200-volt (V), DC capacitor.

The tests were conducted to determine the amount of overtravel or so-called coast in terms of the number of revolutions of both an output shaft and a rotor shaft of an AC-type motor when the electronic brake of the first preferred embodiment was applied to the motor. Similar data was obtained for the purpose of comparison with the AC-type motor operating either without the electronic brake or with brakes having only 4.7 to 100 MFD, 50-ohm, 200-V, DC capacitors.

The tests were conducted according to the following method. The AC-type motor having a shaded pole was run for approximately five seconds. An operator then turned off the relay or switch and measured how many revolutions the output shaft and the rotor shaft of the motor would overtravel or coast through with the electric power turned off.

A chart of the test results is shown below:

| AC-type motor | amount of overtravel or coast in revolutions for | |
|---|---|---|
| with 50-ohm resistance | output shaft | rotor shaft |
| no brake | 1.5 | 43.0 |
| other C-R* combos in 4.7 to 100 MFD range | .05 to 1.0 | 1.5 to 28.0 |
| with electronic brake of invention at 220 MFD | 0 | 0 |

*capacitor-resistor

As can be seen from the data above, the electronic brake of the first preferred embodiment, when operated at 220-MFD capacitance, gave a perfect braking result. In other words, both the output shaft and the rotor shaft of the AC-type motor were stopped instantaneously at zero revolutions when the electronic brake was applied.

Thus, the test by the inventors proved that the size of the capacitor, i.e. the capacitance, and the ohms of the resistors, i.e. the resistance, determines the rate of electrical charge as well as the rate of discharge for the stored energy. Therefore, the amount of stored or potential energy has been proven to be a function of the braking force caused by deceleration of the rotating shafts in the motor and the angular displacement of the shaft when coming to a complete stop.

In FIG. 2, a second preferred embodiment of the electronic brake includes an AC induction motor using a PSC where a 50/60 Hertz (Hz) AC input voltage supply is applied between a first input terminal RLY1 and a second input terminal RLY2 of an inductive relay or switch SPDT. The relay or switch SPDT may include an inductive element I1 connected across the AC input voltage source, a run mode RUN or ON terminal which is normally open and connected to the first input terminal RLY1, and a braking mode OFF or STOP terminal which is normally closed. The relay or switch SPDT also includes a common terminal COM selectively connected to either the RUN terminal or the STOP terminal. In FIG. 2, the common terminal COM is shown to be connected to the STOP or DISCHARGE terminal.

The RUN or CHARGE terminal connects to a first common node shared with an anode side connection terminal of a diode D1 and a first input connection terminal of a single-phase induction motor. The induction motor may be defined as one which generates electromotive force in a closed circuit by inducing a varying magnetic flux through the closed circuit. A first resistive element R1 connects in series between a cathode side connection terminal of the diode D1 and the STOP terminal. A second resistive element R2 connects in series between the STOP terminal and a positive side terminal of an electrolytic aluminum capacitive element C1. A negative side terminal of the capacitive element C1 connects to a second common node shared with the second AC voltage supply input terminal RLY2 and a second input connection terminal of the induction-type motor.

With the relay or switch SPDT in the ON position during the RUN mode operation, the common terminal COM is connected to the RUN terminal and the AC input voltage is applied in parallel across three paths: the inductive element I1 of the relay or switch SPDT; the series connection of the diode D1, the resistor R1, the resistor R2 and the capacitor C1; and the first and second input terminals of the induction-type motor.

While the induction-type motor is ON during this RUN mode operation, the diode D1 rectifies the AC input voltage which is applied across the electrolytic capacitor C1 for charging thereof. The resistors R1 and R2 control the charge rate of the electrolytic capacitor C1.

With the relay or switch SPDT in the OFF or STOP position during the braking mode operation, the common terminal COM is connected to the STOP terminal. The AC input voltage is applied across only the inductive element I1 of the relay or switch SPDT.

The DC voltage, previously charged across the electrolytic capacitor C1 during the RUN mode operation, is dropped across the series connection of the resistor R2 and input terminals of the induction-type motor, thus creating a dynamic braking force which is applied to the induction-type motor.

When the relay or switch RLY1 is switched or flipped over to connect with the STOP terminal during the braking mode operation, all stored voltage developed across capacitor C1, which is in the form of DC voltage, is dropped across a coil of the induction-type motor, which may be a single phase motor using a PSC. Dropping the DC voltage, charged across the capacitor C1 during the RUN mode operation, creates a braking force within the induction-type motor. The inventors learned that the higher the capacitance value of the electrolytic capacitor C1, the more quickly and efficiently the stopping action will be across the induction-type motor due to the braking force created.

In FIG. 2, intermediate elements between the electronic brake on the left-hand side of the drawing and the induction motor on the right-hand side thereof are shown but not described. However, they are described in co-pending U.S. patent application Ser. No. 10/728,860 filed on Dec. 8, 2003. To the extent necessary, the description of such intermediate elements are incorporated herein by reference.

Clearly, numerous modifications and variations of the present invention are possible in light of the above teachings. Therefore, it is understood that, within the scope of the appended claims, the invention may be practiced in other ways than as specifically described herein.

What is claimed is:

1. An electronic brake comprising:
    a motor having input connection terminals;
    an input voltage source for alternating current;
    an inductive relay or switch having first and second input terminals connected to the input voltage source, said inductive relay or switch including an inductive element connected across the input voltage source, a run mode terminal connected to the first input terminal, a braking mode terminal connected to the second input terminal, and a common terminal selectively connected to either the run mode terminal or the braking mode terminal;
    a diode having a cathode side connection terminal and an anode side connection terminal to which the run mode terminal is connected by way of a first common node to one of the input connection terminals of the motor;
    a first resistive element connected in series between the cathode side connection terminal of the diode and the braking mode terminal;
    an electrolytic capacitive element having a positive side terminal and a negative side terminal;
    a second resistive element connected in series between the braking mode terminal and the positive side terminal of the capacitive element; and
    a second common node shared with the second input terminal of the inductive relay or switch and another one of the input connection terminals of the motor.

2. An electronic brake according to claim 1, wherein:
    said motor is an alternating current-type.

3. An electronic brake according to claim 2, wherein:
    said alternating current-type motor has a shaded pole and a coil.

4. An electronic brake according to claim 1, wherein:
    said motor is an induction-type.

5. An electronic brake according to claim 4, wherein:
    said induction-type motor uses a permanently split capacitor.

* * * * *